(12) United States Patent
Robledo

(10) Patent No.: US 7,763,790 B2
(45) Date of Patent: Jul. 27, 2010

(54) METHOD OF REPRESENTING RHYTHM IN MUSIC NOTATION AND DISPLAY THEREFOR

(76) Inventor: Devra L. Robledo, 812 W. North St., Anaheim, CA (US) 92805

( * ) Notice: Subject to any disclaimer, the term of this patent is extended or adjusted under 35 U.S.C. 154(b) by 249 days.

(21) Appl. No.: 11/765,975

(22) Filed: Jun. 20, 2007

(65) Prior Publication Data

US 2008/0314229 A1 Dec. 25, 2008

(51) Int. Cl.
*G09B 15/02* (2006.01)
(52) U.S. Cl. .................................. 84/483.2; 84/470 R
(58) Field of Classification Search ............... 84/483.2, 84/483.1, 484, 471 SR, 470 R
See application file for complete search history.

(56) References Cited

U.S. PATENT DOCUMENTS

| | | | |
|---|---|---|---|
| 1,319,919 A | 10/1919 | Barker | |
| 2,271,772 A * | 2/1942 | Maffei | ........................ 84/483.1 |
| 2,329,551 A | 9/1943 | Moster | |
| 2,483,570 A | 10/1949 | Bergey | |
| 4,070,944 A | 1/1978 | del Castillo | |
| 4,464,971 A * | 8/1984 | Dean | ......................... 84/471 R |
| 2005/0016361 A1 * | 1/2005 | Ikeya et al. | ................... 84/602 |

FOREIGN PATENT DOCUMENTS

WO    WO 94/14146    6/1994

\* cited by examiner

*Primary Examiner*—Jianchun Qin
(74) *Attorney, Agent, or Firm*—Knobbe Martens Olson & Bear LLP

(57) ABSTRACT

A music notation display system that adds distinguishable timing bars to standard music notation assists students learning to read music and assists musicians to correctly play rhythms in music. Each timing bar corresponds to an equally timed portion of a measure of written music, such as a certain number of beats or half-beats. The timing bars may be depicted as differently shaded, patterned, or otherwise differentiated background areas to the notes and rests of the music. Musical notes and rests that fall within a timed portion of the music that corresponds to a timing bar are displayed within a space defined by the timing bar. The widths of timing bars across a musical staff may be equal, or may vary, such as to accommodate printing associated lyrics of different lengths or to comfortably fit in the notes of the timed portion. Embodiments of the system are usable with various music notation systems, such as Braille and/or computer-implemented music notation systems.

10 Claims, 9 Drawing Sheets

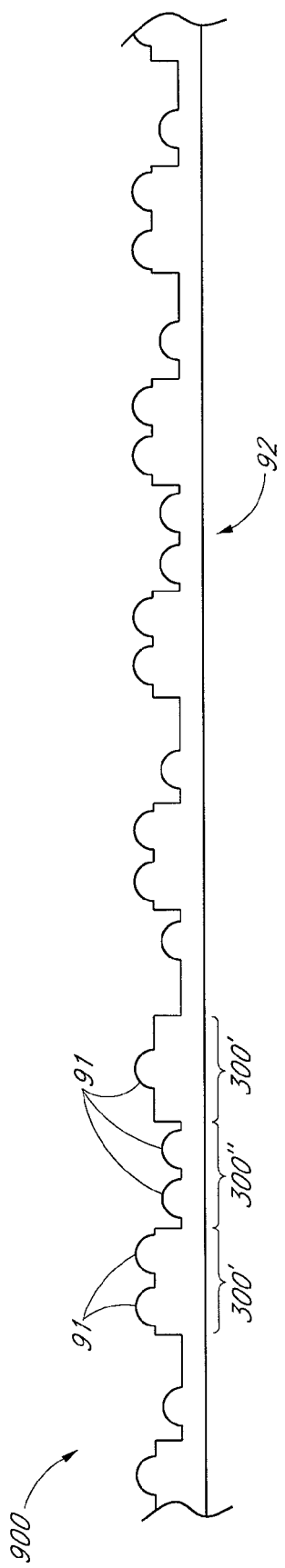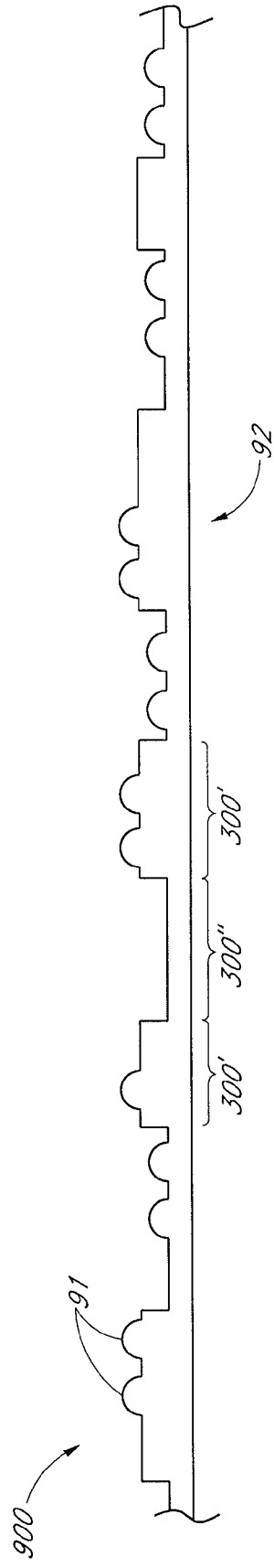

METHOD OF REPRESENTING RHYTHM IN MUSIC NOTATION AND DISPLAY THEREFOR

BACKGROUND OF THE INVENTION

1. Field of the Invention

The invention relates to displays of music notation and, in particular, to displays for depicting rhythmic aspects of music notation.

2. Background of the Invention

Standard music notation typically includes a variety of symbols that are printed or otherwise displayed across at least one musical staff. The symbols denote different tonal, rhythmic, and other aspects of the music, which may be very confusing to a beginning music reader, and especially to a music reader who may be simultaneously learning to master a new instrument.

One important aspect of learning to read music is understanding how to correctly interpret the timing-related elements of the notes and rests that provide the rhythm to the music. This aspect of reading music takes on added importance when more than one music reader wishes to sing or play music together with another. Music teachers typically desire effective techniques to assist their students to properly read and play the rhythm in music.

SUMMARY OF THE INVENTION

A method and display are disclosed to assist music readers to readily discern timing-related aspects of music notation in a manner that is easily usable even while playing the music. A music notation display system that adds easy-to-read timing bars to standard or other types of music notation assists music readers learning to read and correctly play rhythms. Each timing bar corresponds to an equally timed portion of a measure of written music, such as a certain number of beats or portions of beats. The timing bars may be displayed as differently shaded or otherwise differentiated background areas to the notes and rests of the music. Musical notes and rests that fall within a timed portion of the music corresponding to a timing bar are displayed within a space defined by the timing bar. The widths of timing bars across a musical staff may be equal or may vary, such as to accommodate the printing of associated lyrics of different lengths or to comfortably fit in the notes of the timed portion. Embodiments of the display system are usable with various musical notation systems, including, for example, Braille music notation, and/or may be used with various presentation media, including, but not limited to, printed sheet music and/or computer-implemented or other electronic music notation systems.

An embodiment of a method of representing rhythm in a music composition is disclosed. The embodiment of the method comprises providing a plurality of musical notes, where each musical note is associated with a number of beats, or a portion of a beat. The musical notes can be displayed on a musical staff comprising five horizontal lines and divided amongst a plurality of measures, each measure being defined, at least in part, by one or two measure bars placed across the musical staff in a direction perpendicular to the five horizontal lines. Each measure can further represent an equal number of beats of the musical composition. The embodiment of the method also comprises providing a plurality of timing bars on the musical staff, such that each timing bar represents an equal number of beats within a measure, wherein each timing bar is visually distinguishable from a timing bar adjacent to it along the musical staff, and wherein the one or more musical notes of the measure are visually displayed within the timing bars, based, at least in part, on the number of beats or portions thereof associated with each of the musical notes.

An embodiment of a method of displaying rhythm in musical notation is disclosed. The embodiment of the method comprises: providing at least one musical staff upon which musical symbols representing music may be displayed and providing a plurality of timing bars along the musical staff, each timing bar extending across the musical staff, wherein adjacent timing bars are distinguishable from one another. Each timing bar corresponds to an equal timed portion of the music and defines a space on the musical staff within which can be displayed one or more musical symbols corresponding to musical notes and rests to be played during the equal timed portion of the music.

An embodiment of a display for representing rhythm in musical notation is disclosed. The display includes at least one musical staff upon which can be displayed symbols for musical notes included in the music and measures into which the music can be divided. The display further includes a plurality of timing bars that are placed sequentially along the musical staff and that extend across the staff, wherein adjacent timing bars have different backgrounds. The timing bars correspond to equal timed portions of the music and define spaces suitable for displaying one or more musical symbols representing notes to be played within said timed portions of the music, wherein each measure includes at least two timing bars.

An embodiment of a method for assisting the reading of music is disclosed. The embodiment of the method includes adding timing bars to musical notation, wherein the musical notation comprises musical notes, divided into measures that represent equal timed portions of the music; and wherein the timing bars represent equal timed portions of the measures. Each timing bar has a width within which one or more of the musical notes can be displayed, and timing bars are distinguishable from their adjacent timing bars.

For purposes of summarizing embodiments of the invention, certain aspects, advantages, and novel features of the invention have been described herein. It is to be understood that not necessarily all such aspects, advantages, or novel features will be embodied in any particular embodiment of the invention.

BRIEF DESCRIPTION OF THE DRAWINGS

Embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

FIG. 9A depicts one embodiment of a musical notation system using equal width timing bars for readers of Braille music notation.

FIG. 9B depicts one embodiment of a musical notation system using unequal width timing bars for readers of Braille music notation.

DETAILED DESCRIPTION OF THE PREFERRED EMBODIMENT

Rhythm is an important element of music, and learning to correctly recognize and interpret timing-related elements of music notation is an important aspect of learning to read and play music. The systems and methods disclosed herein assist a music reader to understand and more easily discern timing-related aspects of music notation so that the rhythm of the music may be played as it is written.

It should be noted that, for ease of description, throughout portions of this disclosure, the systems and methods are described in relation to printed or written musical notation, such as that found on sheet music. However, as will also be described, the systems and methods may, additionally or alternatively, be advantageously used with other forms of music notation, such as, for example, electronically displayed music notation or music notation written in Braille. Thus, the terms "written" and "printed" as used herein are to be construed broadly as meaning being displayed or otherwise presented to a music reader. The display may be a visual display, such as a printed, drawn, electronic, or other computer generated display, and/or may be a display that is otherwise perceived by the reader, such as a tactile display of Braille music notation. It should also be noted that, for ease of description, the systems and methods described herein have been described primarily with reference to one of the most commonly used music notation systems used for music worldwide. However, one of skill in the art, upon reviewing this disclosure will understand that the systems and methods described herein may also be adapted and used in conjunction with other systems of music notation, including notation systems used for rhythm instruments and music notation systems from other parts of the world.

Figure 1A:
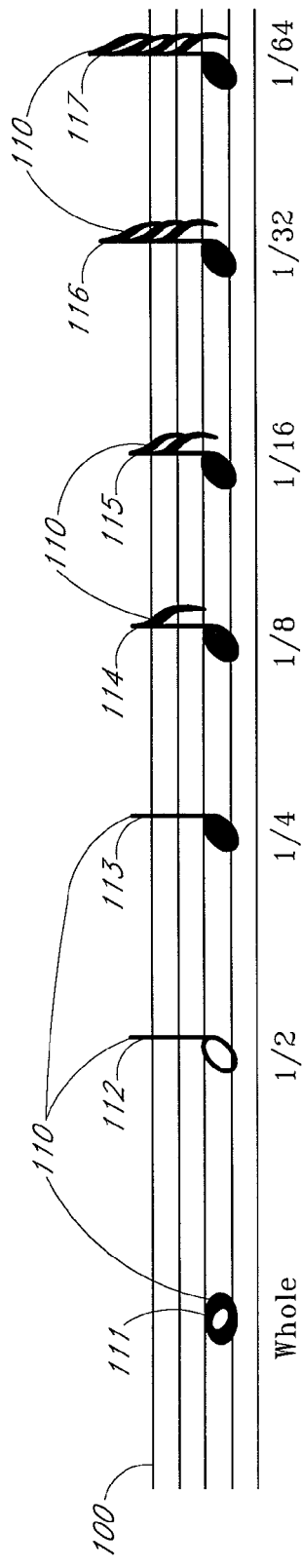
FIG. 1A depicts notes of various durations on a musical staff.

FIG. 1A depicts notes 110 of various durations on a musical staff 100. The musical staff 100, as depicted in FIG. 1A, includes five parallel lines with spaces interposed between the lines. In general, the notes 110 are read from left to right. Each written note 110 is associated with a musical pitch based on the vertical placement of the note 110 with respect to the lines and spaces of the musical staff 100. Each note 110 is also associated with a duration for playing the pitch. The duration of a note is indicated by the shape of the note 110, and several examples of notes of different durations 111-117 are depicted in FIG. 1A. For example, a whole note 111 is shaped approximately like an open oval, and has a duration that is typically held for four beats. A half note 112 is shaped approximately like an open oval with an attached vertical line and is typically held for two beats. A quarter note 113 is shaped approximately like a filled in oval with an attached vertical line is typically held for one beat. An eighth note 114 is shaped approximately like a filled in oval with an attached vertical line and a "tail" and is typically held for one half a beat. A sixteenth note 115 is shaped approximately like a filled in oval with an attached vertical line and two "tails" is typically held for one-fourth of a beat. Similarly notes with three tails or four tails may be used for durations of one-eight of a beat 116 or one-sixteenth of a beat 117, respectively. Frequently, two or more adjacent notes with tails may be written in a form such that two or more of the tails are replaced by a bar, also known as a beam, that conjoins the two or more adjacent notes.

In addition to the durations of notes depicted in FIG. 1A, other methods of depicting the duration of a note may also be used in musical notation. For example, adding a small dot after one of the notes 110 exemplified in FIG. 1A indicates that the note is to be played for 150% of its normal duration. Thus, a half note 112 followed by a dot is played for three beats instead of two, and a quarter note 113 followed by a dot is played for one and one-half beats instead of one. Some examples of notes with a following dot are depicted in FIG. 2.

Figure 1B:
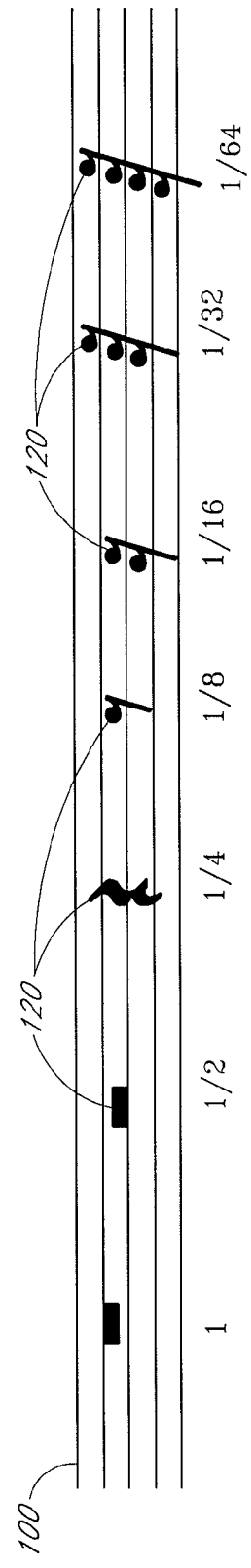
FIG. 1B depicts rests of various durations on a musical staff.

Frequently, music includes beats, or portions of beats, in which no sound is to be played. For such silent portions of the music, symbols denoting "rests" 120 of various durations are written on the musical staff 100 and are read together with the notes 110. Although rests 120 are not associated with a pitch, or with any sound, they are associated with a given duration and thus are important for a rhythmically correct reading of written music notation. Students learning to read music also learn to recognize the durations associated with various rest symbols 120. FIG. 1B depicts symbols used for rests 120 of various durations. For each of the notes 110 depicted in FIG. 1A, a rest 120 of the same duration is depicted in FIG. 1B. For purposes of this disclosure, the terms "note" or "notes" may thus refer to notes 110 and/or to rests 120. It should be noted that the fractions written below the notes in FIGS. 1A and 1B are included for descriptive purposes and are not typically included, except for elementary educational purposes, in the notation for musical compositions.

As illustrated in part by FIGS. 1A and 1B, a music reader has many symbols to learn in order to correctly understand the rhythm depicted in a piece of written music.

Figure 2:
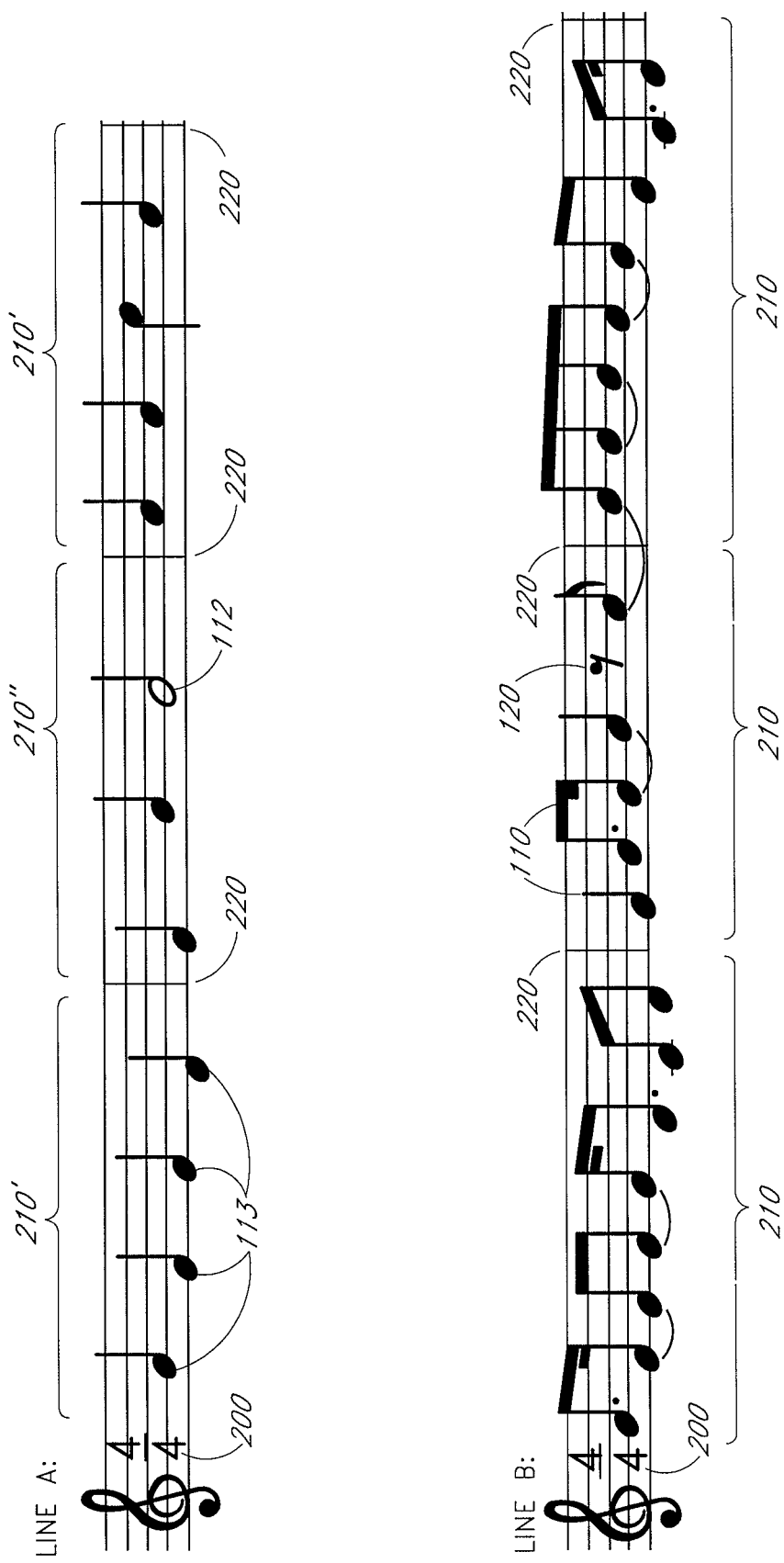
FIG. 2 depicts musical notation for several measures of music.

FIG. 2 depicts two lines of musical notation. Frequently, as is seen in FIG. 2, the notes 110 and rests 120 of musical notation are divided by bar lines 220 into measures 210 of equal duration. A time signature 200 indicates how many beats will be in each measure 210 of the musical notation to follow. The time signature 200 includes two numbers: an upper number that indicates the number of beats per measure 210, and a lower number that indicates what type of note 110 corresponds to one beat. For example, in FIG. 2, the time signature 200 indicates "four-four time," which means that each measure 210 of the music has four beats, and each beat is equal in duration to a quarter note 113. Two other examples of commonly used time signatures 200 are "three-four time," also known as "three-fourths time," in which each measure has three beats, and each beat is equal in duration to a quarter note 113, and "six-eighths time," in which each measure has six beats, and each beat is equal in duration to an eighth note 114. Many other possible time signatures 200, both common and uncommon, may be advantageously used in conjunction with the timing bar systems and methods described herein.

In Line A of FIG. 2, the first and third measures 210' include four quarter notes 113 each. Each quarter note 113 is held for the same duration. The second measure 210" includes two quarter notes 113 and one half note 112 each. Here, the first two notes are held for the same duration as the notes played in the first measure, and the half note 112 is held for a duration that is twice as long. Comparatively speaking, this line of musical notation may be relatively easy for a beginning musician or other music reader to interpret.

Line B of FIG. 2 has the same four-four time signature 200 as does Line A. However, Line B includes notes of several different durations, and it may be more complicated for a beginning musician or other music reader to recognize which notes 110 and rests 120 are associated with which beats within each measure 210 when the music is written using only conventional methods.

Figure 3:
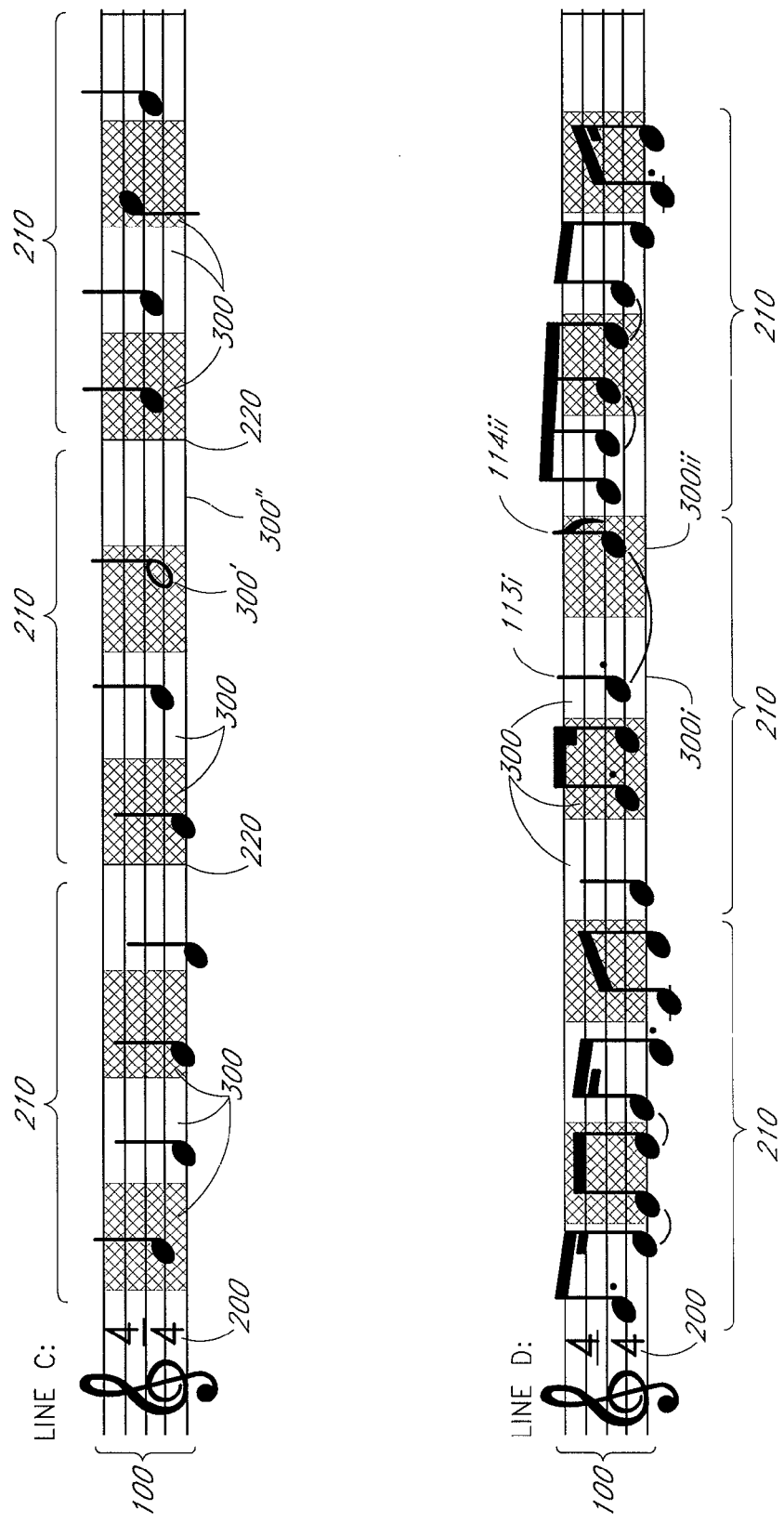
FIG. 3 depicts one embodiment of musical notation with timing bars for the measures of music from FIG. 2.

FIG. 3 depicts one embodiment of musical notation that advantageously includes timing bars 300 to assist musicians and/or other music readers to recognize rhythmic aspects of the music. Lines C and D of FIG. 3 depict the same music as was shown in Lines A and B of FIG. 2.

In FIG. 3, the timing bars 300 are portrayed as differently shaded, patterned, and/or colored portions of the musical staff 100 that extend along the width of the staff 100. Adjacent timing bars 300 are distinguishable from one another. In most embodiments, adjacent timing bars 300 are visually distinguishable from one another. For example, in both Line C and Line D of FIG. 3, the timing bars 300 are implemented using alternating shaded/patterned and unshaded/unpatterned backgrounds to allow a music reader to easily discern between adjacent timing bars 300. In one embodiment, timing bars 300 are distinguishable from adjacent timing bars 300 by their coloring. In some embodiments, adjacent timing bars 300 may be distinguishable from one another using other methods that allow for a tactile or other discernment between adjacent timing bars 300, such as, for example, using differently patterned, embossed, or textured backgrounds, or the lack of any background for the timing bars 300.

It should be noted that although the term "background" may be used and although notes 110 and rests 120 may be described as being printed on a background, and/or may appear to be printed on a background, in some embodiments, the pattern, color, shading, or other distinguishing feature that identifies a timing bar 300 may not be literally printed behind the notes and rests. In some embodiments, the timing bars 300 may be printed over the notes 110, or the notes 110 and background pattern/shading may be printed together, in a manner that allows reading of notes 110 through or in conjunction with the timing bar 300.

Timing bars 300 are associated with a given duration of the music that is preferably an equal timed portion of a measure 210, such as an equal number of beats or portions of beats. Timing bars 300 of a given section of music notation are also preferably associated with the same duration as one another. For example, in FIG. 3, the timing bars 300 of both Line C and Line D are associated with one beat of the music. Since, in accordance with the time signatures 200 for Lines C and D, each measure 210 includes four beats, each measure also includes four timing bars 300. Thus, each timing bar 300 is associated with a duration equal to one quarter note 113, or the equivalent in other notes 110 and rests 120.

In various embodiments, each timing bar 300 has a width within which notes and/or rests can be displayed. Notes 110 and/or rests 120 that fall within a given timing bar 300 are to be played during the associated duration of the music. In the embodiment depicted in Line C of FIG. 3, when a timing bar, such as timing bar 300", includes no note 110 and no rest 120, it is understood that a note 110 or rest 120 from the previous timing bar 300' is intended to continue through the duration of the empty timing bar 300". In other embodiments, the continuation of a note 110 or rest 120 for longer than the duration of a timing bar 300 may be indicated in another manner. For example, a symbol after the note 110 or rest 120 may indicate that the note or rest should be held. The symbol may be, for example, a curved, straight, dotted or dashed line, or one or more arrows, that extend from the note 110 or rest 120 into the empty timing bar 300". A practitioner of skill in the art will recognize that other types of notation may be used to indicate that a note 110 or rest 120 should continue to be held for longer than the duration of one timing bar.

In Line D, the division of measures 210 into easily discernible timing bars 300 advantageously assists a music reader to understand how the notes 110 and rests 120 of the music are to be played rhythmically. Line D is accordingly much easier to read, for both beginning and advanced music readers, than is the same music as depicted in line B of FIG. 2. The differently shaded backgrounds of the timing bars 300 provide a cue to the reader that is intuitively easy to understand, thereby providing more information without additionally unduly taxing the reader's brain. As illustrated by Line D, the timing bars 300 provide an additional advantage in allowing a music reader to learn a variety of combinations of notes 110 and/or rests 120 that are equivalent to one another by viewing a variety of combinations that fall within various timing bars 300.

As depicted in FIG. 3, Line C is an example of an embodiment that provides timing bars 300 in conjunction with the use of measure bar lines 220 to explicitly delineate the measures 210, and Line D is an example of an embodiment that provides timing bars 300 without the use of measure bar lines 220 to explicitly delineate the measures 210.

In some embodiments, the position of a note within a timing bar 300 can serve to designate timing-related information for the reader of the music. For example, in timing bar $300_i$ of Line D, the dotted quarter note $113_i$ is held for both timing bar $300_i$ and for the first half of timing bar $300_{ii}$. Accordingly, the eighth note $114_{ii}$ in timing bar $300_{ii}$ is positioned towards the end of the timing bar $300_{ii}$, that is, to the right hand side of the timing bar $300_{ii}$ to indicate that the eighth note $114_{ii}$ is to be played in the second half of the timing bar $300_{ii}$. Thus, in some embodiments, the location of a note within a timing bar 300 may communicate to the reader when the note is to be played with respect to the timed portion of the timing bar 300 in which it is placed. In such embodiments, for example, notes that are to be played for the full duration of a timing bar 300 can be positioned towards the beginning, left-hand side of the timing bar 300. In other embodiments that use timing bars 300 with other forms of musical notation, other methods of using the placement of notes and/or rests within a timing bar 300 may provide additional information to assist music readers.

Figure 4:
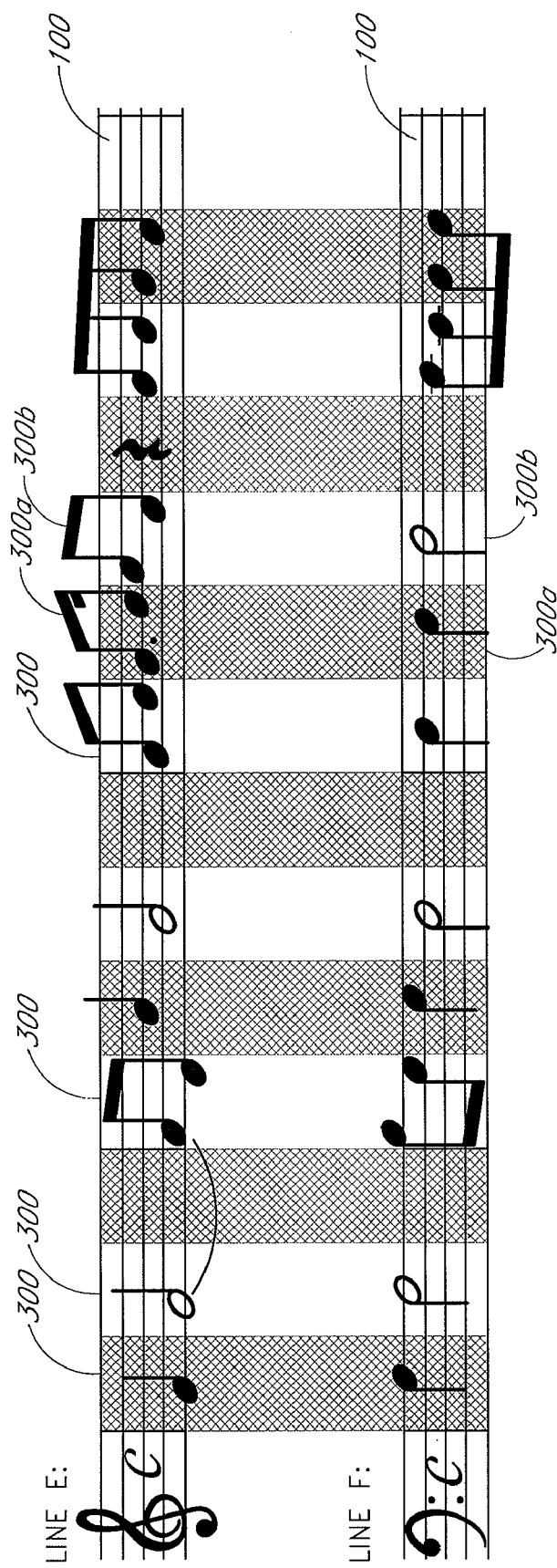
FIG. 4 depicts one embodiment of musical notation with correlated timing bars for two lines of music to be played together.

FIG. 4 depicts one embodiment of musical notation with correlated timing bars for two lines of music to be played together. Line E and Line F of FIG. 4 depict two lines of music that may be played together, such as music to be played by the right and the left hands of a piano player or by more than one music player. Such lines of music are frequently displayed one above the other, with notes 110 and rests 120 that are to be played simultaneously being vertically aligned. Two or more such lines of vertically aligned music may also be used for a musical composition in which two or more musicians play together, such as, to cite some examples, for a duet, a quartet, or a symphony.

In the embodiment shown in FIG. 4, the timing bars 300 advantageously extend across the staves 100 of both Line E and Line F, helping the music readers to more easily discern which notes 110 and rests 120 from each line of music are to be played at the same time. Timing bars 300 may also extend across more than two staves 100 of music that are to be played simultaneously. As can be seen in FIG. 4, in some timing bars 300, patterns of notes 110 of the same durations are to be played for both lines of music. For example, both lines of music may indicate quarter notes that are to be played simultaneously. In other timing bars 300a, 300b the two lines have notes 110 of different durations that are to be played during the same timed portion of the music. Thus, the timing bars 300 advantageously assist the music readers to understand which notes are to be played in the same portion of the music, even when each musician (or each hand) may play a slightly different rhythm.

Figure 5:
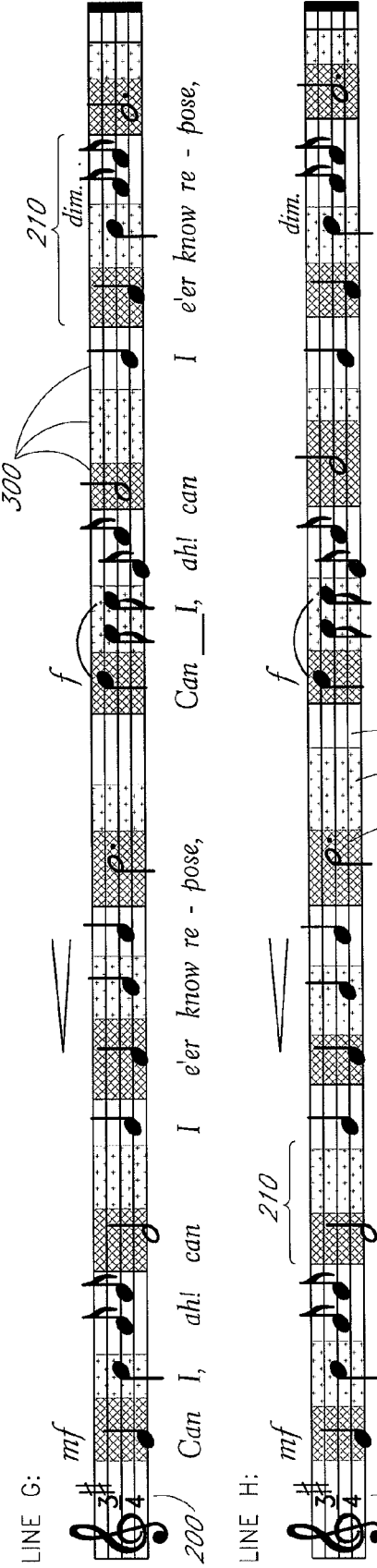
FIG. 5 depicts one embodiment of musical notation with timing bars of unequal widths.

In FIG. 5, Line G and Line H are two lines of music from different verses of a song. Lines G and H both display the same music, but each line has a different set of lyrics displayed below. FIG. 5 depicts an example of an embodiment in which timing bars 300 may be displayed having different widths, such as to accommodate lyrics of different lengths, although each timing bar 300 still represents an equal number of beats or portions of beats of the music. Using timing bars 300 with unequal widths allows the music and lyrics to be displayed in an uncramped manner, while still communicating to the music reader in an easily discernible manner that equal timed portions of the music and lyrics correspond to each timing bar 300.

Timing bars 300 having unequal widths may also be used advantageously when a large number of notes or other musical symbols are to be included within a timing bar 300. For example, in music notation with timing bars 300 that represent one quarter note worth of time each, a timing bar 300 that includes only one quarter note or one quarter rest may be displayed in relatively narrow timing bar 300, while still providing space for an uncramped display of the note or rest. Another timing bar 300 that includes four one-sixteenth notes, or eight one-thirty-second notes, to be played within an equivalent space of time may benefit from a greater width in which to display the notes. The use of variable-width timing bars 300 may provide the additional advantage of allowing for an economical use space for the music notation, if desired. For example, in contrast, if only equal width timing bars 300 were used, a piece of music needing only one such extra-wide timing bar 300 may wastefully use extra-wide timing bars 300 for even the single-note timing bars, leaving an undesired amount of empty space within most of the timing bars 300. The systems and methods described herein advantageously allow for the use of equal width timing bars, variable width timing bars, or both.

As is also depicted in FIG. 5, the time signatures 200 of Lines G and H indicate that each measure 210 of the music is to have three beats and that each beat is equal to one quarter note. In FIG. 5, each timing bar 300 corresponds to one beat. Accordingly, each measure 210 includes three timing bars 300. In the embodiment shown in FIG. 5, three shades of timing bars 300 are advantageously used within each measure 210: a darker timing bar 300c, a lighter timing bar 300d, and a lightest timing bar 300e. A music reader is thereby assisted to easily recognize the beginning of each measure 210, which, in the example of FIG. 5, begins with a darker timing bar 300c. As will be understood by one of skill in the art, in light of the present disclosure, in other embodiments, other methods of arranging timing bars of two, or more than two, discernibly different types may be used to assist music readers to correctly interpret musical notation.

Figure 6A:
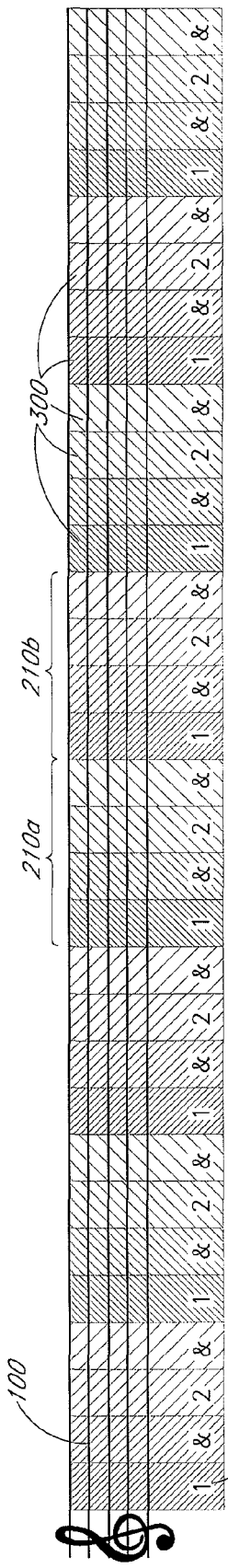
FIGS. 6A-6C depict several embodiments of musical staves with timing bars suitable, for example, for blank sheet music paper.
Figure 6B:
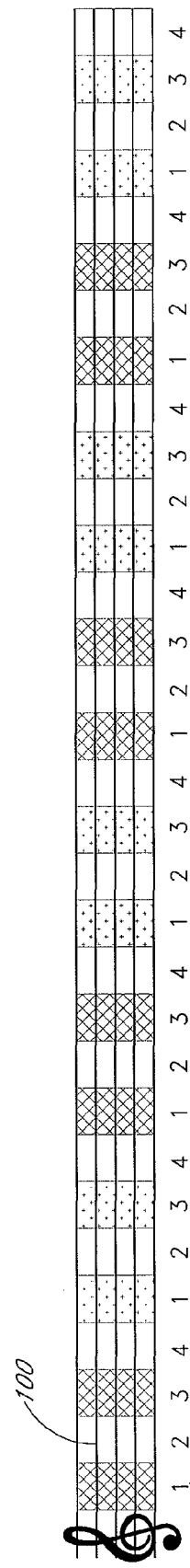
Figure 6C:
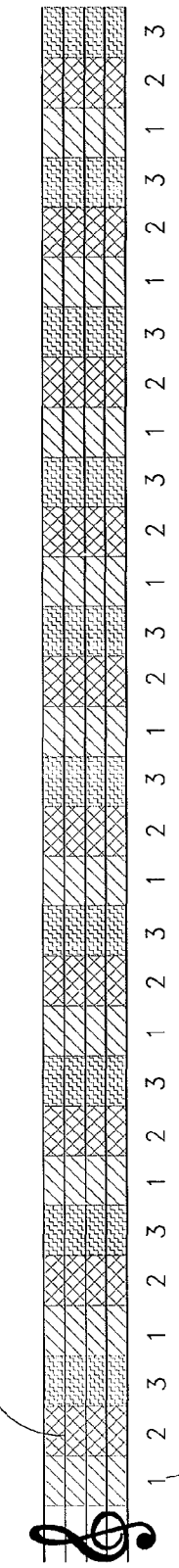

FIGS. 6A-6C depict several embodiments of "blank" musical staves 100 with timing bars 300 suitable for sheet music paper upon which musical notation may be added. Such sheet music paper with pre-printed or pre-displayed staves 100 and timing bars 300 may be made available as individual sheets or composition books or pads for use by musical teachers, students, composers, and the like, to write music using timing bars 300 and/or to read music that has been written using the timing bars 300. The pre-displayed timing bars 300 may advantageously assist a music writer to insert notes 110 and rests 120 of correct durations on the staves 100 and may assist a music reader to correctly interpret the rhythmic aspects of the music, as has been described with reference to FIGS. 2-5.

Measure bar lines 220 have not been explicitly included in the examples embodiments of FIGS. 6A-6C and may be added by a user of the sheet music paper. In other embodiments, measure bar lines 220 may be included.

FIG. 6A depicts a sample embodiment in which different types of coloring, shading, or other distinguishing method is used to differentiate the timing bars 300 of a first measure 210a from the timing bars of an adjacent measure 210b. In this way, the timing bars 300 assist a music reader to discern between one measure 210 and the next. In the example depicted in FIG. 6A, a timing bar shading scheme is used that uses gradated shading for timing bars within a measure 210a, and that uses a different pattern family for adjacent timing bars 210b. For example, the timing bars of measure 210a have upward-slanting patterns that appear to range from darkest to lightest, from left to right. The timing bars of adjacent measure 210b have downward-slanting patterns that also appear to range from darkest to lightest, from left to right. Thus, the patterns of the timing bars 300 may assist a music reader and/or writer to differentiate between adjacent measures 210a, 210b and to identify the beginning of each measure 210.

In other embodiments, color may be similarly used. For example, various darker and lighter shades of one color, such as reds, may be used for the timing bars of one measure, while various darker and lighter shades of another color, such as greens, may be used for the timing bars of adjacent measures. The colors may thus be alternated across the measures 210 of the staff 100. Alternating the coloring, shading, or other differentiating method used for timing bars of adjacent measures 210 may assist a music reader to keep and/or easily re-find his or her place while reading music notation written across the timing bars and staff 100.

In the example depicted in FIG. 6B, another advantageous timing bar shading scheme is used that assists a music reader and/or writer to easily distinguish between timing bars 300 and between measures 210. In FIG. 6B, the timing bars of each measure alternate between patterned and unpatterned backgrounds. In addition, the patterns used for adjacent measures along the musical staff 100 alternate, thereby assisting a music reader to distinguish between adjacent measures. Alternating the coloring, shading, or other differentiating method used for timing bars of adjacent measures 210 may additionally or alternatively assist a music reader to keep and/or easily re-find his or her place while reading music notation written across the timing bars and staff 100.

In the example depicted in FIG. 6C, a timing bar shading scheme is used in which three shading patterns are alternated. The embodiment depicted in FIG. 6C includes a staff 100 with timing bars 300 that is especially suitable for adding music in which each measure 210 has three beats, or six beats, or another number of beats that is a multiple of three. Here, if each measure is to include three timing bars, each measure may advantageously begin with a lightest colored timing bar.

In each of FIGS. 6A-6C, a line of numbers 600 has been written under the staff 100 such that each number corresponds to a timing bar 300. In some embodiments, such as in FIG. 6A, the timing bars 300 extend down to encompass the line of numbers 600. In some embodiments, such as in FIGS. 6B and 6C, the timing bars 300 do not extend down to encompass the line of numbers 600. In other embodiments, the line of numbers 600 is presented above the staff 100 and the timing bars 300 may include the line of numbers 600 or may not extend up to include the line of numbers 600.

The numbers 600 represent a kind of rhythmic counting that music teachers frequently use, often verbally, to assist their students to grasp the rhythm of a piece of music. For example, the number line 600 of FIG. 6A corresponds to a familiar "one-and-two-and-one-and-two-and" method of verbally counting out the rhythm of a piece of music. Including the number line 600 may help music readers grasp a correspondence between the verbal counting and the visual timing bars 300. In other embodiments, this number line 600 may be omitted. When the line of numbers 600 is omitted, a music writer has more flexibility to assign a given number of timing bars per measure 210 of music. For example, in the examples of FIGS. 6A and 6B, where the number line 600 indicates four beats per measure, the same timing bar pattern scheme may be used with eight (or some other multiple of four) timing bars per measure, or with two timing bars per measure. In the example of FIG. 6C, where the number line 600 indicates three beats per measure, the same timing bar pattern scheme may be used with six (or some other multiple of three) timing bars per measure As will be understood by one of skill in the art, upon review of the present disclosure, the embodiments described with reference to FIGS. 6A-6C may also be advantageously used in conjunction with other methods of music notation display, such as, for example, computerized or other electronic display for music composition.

Several types of music composition software programs are currently available for users wishing to compose, transpose, transcribe, or otherwise "write" musical notation with the help of a computer. Various embodiments of the systems and methods disclosed herein provide for the use of timing bars 300 in conjunction with one or more music notation software programs. In some embodiments, timing bars may be displayed along the staff 100 before a user adds notes 110 and/or rests 120 to the staff 100. Such pre-displayed timing bars 300 may assist the user in correct placement of the notes 110 and/or rests 120. In some embodiments, a user may use the program without pre-displayed timing bars 300, and timing bars may be automatically or optionally added to the music notation as desired by the user.

For example, in some automated music notation programs, after the user adds notes 110 and the like for a piece of music, the user may instruct the program, by way of a menu selection, a mouse click, or other method, to add timing bars 300 to the music. As will be familiar to one of ordinary skill in the art, in light of the present disclosure, an automated system may be programmed to calculate a correct placement for the timing bars 300. In some programs, timing bars 300 may be automatically inserted to the music notation as the user creates the music. In some embodiments, the user of an automated program may "manually" instruct the program to insert a timing bar 300 at a desired placement. In some embodiments, users may be offered a selection of two or more timing bar shading schemes between which to choose. As will further be familiar to one of ordinary skill in the art in light of the present disclosure, other variations of automated systems may be used in conjunction with the timing bars 300 disclosed herein.

Figure 7:
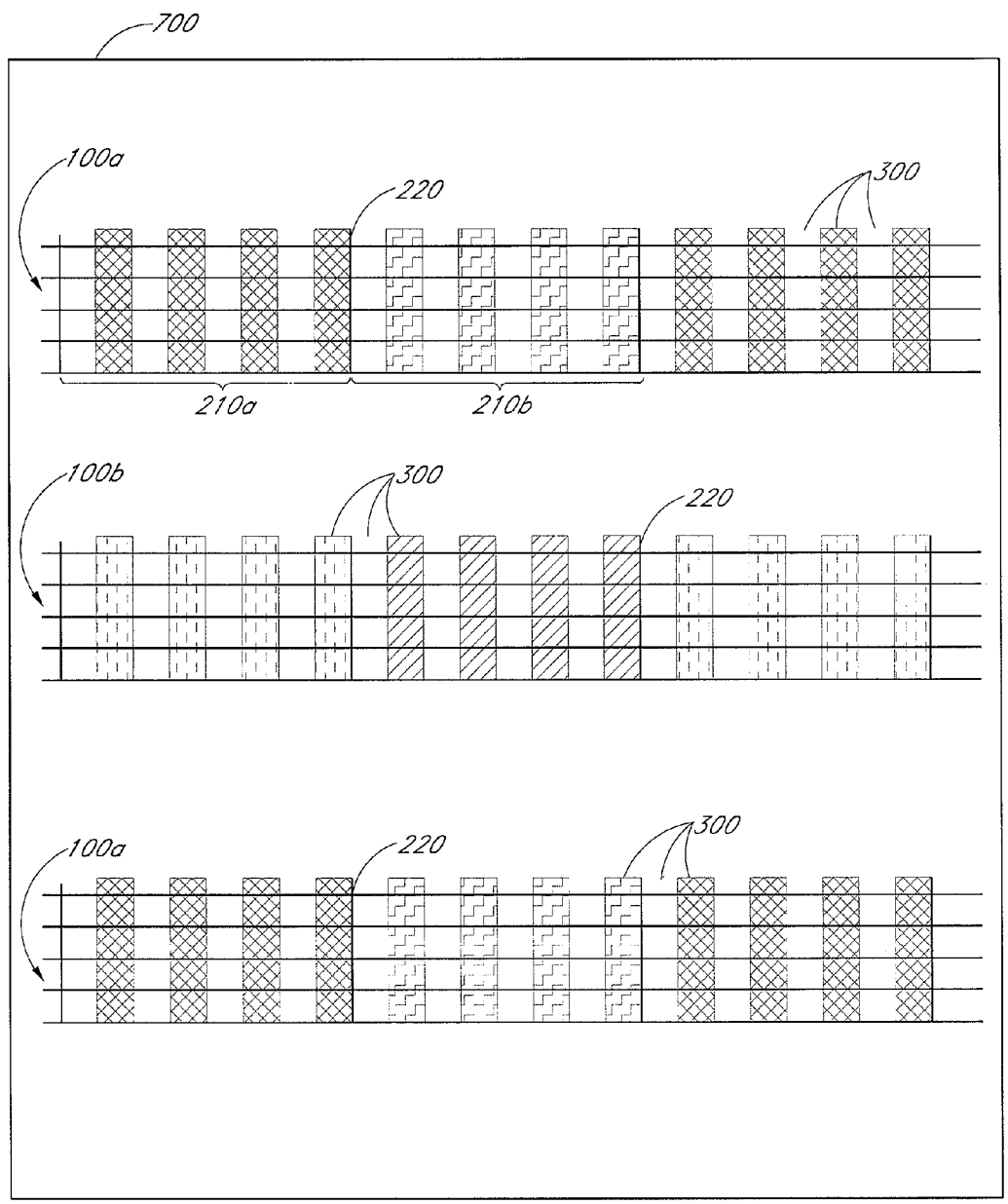
FIG. 7 depicts an additional embodiment of musical staves with timing bars suitable for blank sheet music paper.

FIG. 7 depicts an additional embodiment of musical staves with timing bars 300 suitable for blank sheet music paper 700 or other non-paper display without the initial inclusion of notes 120 and/or rests 110. In the example shown in FIG. 7, different background shadings are used for timing bars in adjacent measures 210a, 210b. Measure bar lines 220 are included to delineate the measures. In addition, different sets of background shadings are advantageously used for timing bars 300 on adjacent musical staves 100 in order to assist a music reader to more easily identify a next line of music to play when the music reader reaches the end of a line of music. In the example of FIG. 7, different sets of shading schemes are used on alternate staves 100a, 100b of the music. A timing bar shading scheme that provides different sets of shadings for different lines of music, such as for alternating staves 100 of music, may also be used in embodiments in which the notes and rests are pre-printed or otherwise provided for a music reader.

In paper-based, blackboard, or similar sheet music, staves 100 that include timing bars 300, but that do not yet include notes or rests, the timing bars are frequently provided in an equal-width format, since the number of notes or length of words to be added is unknown at the time of printing.

In other embodiments in which the blank staves 100 with timing bars 300 are included in a computer software program for music composition, or in an electronic interactive "blackboard" display, the timing bars 300 may be dynamically sized to suit the size of musical symbols and/or lyrics that are added to the blank staves 100. In some such embodiments, determining sizing of the timing bars 300 may be performed by an automated system. In other embodiments, a user may select one or more desired sizes for one or more timing bars 300.

Figure 8:
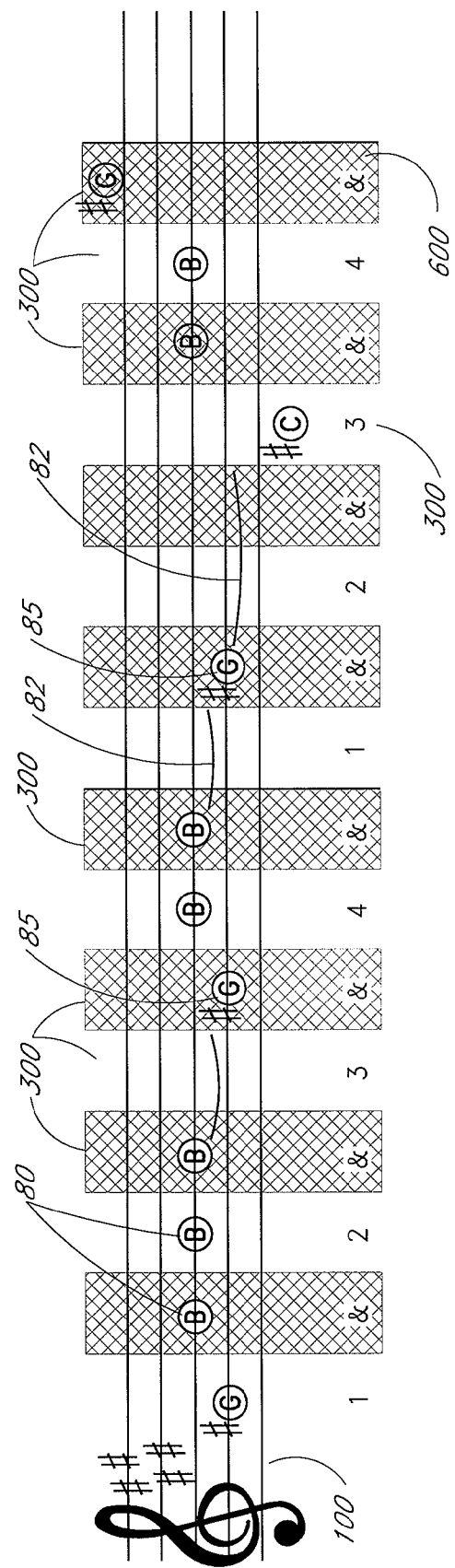
FIG. 8 depicts one embodiment of a simplified musical notation system using timing bars for instructing beginning music students.

FIG. 8 depicts one embodiment of a simplified musical notation system using timing bars 300 for instructing beginning music students. FIG. 8 depicts musical symbols on a staff 100 with timing bars 300. In addition, a number line 600 below the staff 100 provides additional cues related to the rhythm of the music. The embodiment depicted in FIG. 8 uses simplified note symbols 80, 85 that provide information about the name of a note being displayed, so that a music reader may begin to associate the name of the note with the vertical location of the note with respect to the lines of the staff 100. In the example shown in FIG. 8, the simplified notes 80, 85 are displayed as hollow circles with the note's letter-name inscribed within. The embodiment depicted in FIG. 8 also includes an example of a symbol used to indicate when a note should be extended for more than a single timing bar 300. Here, a trailing tail 82 may be added to a note 80, 85. As will be understood by one of skill in the art in light of this disclosure, in other embodiments, other simplified symbols to indicate notes and other methods of indicating that a note is to be extended may be used. In some embodiments, such as those in which color may be used, sharp-notes 85, indicated with a # symbol in FIG. 8, may be presented in a different color to distinguish them from notes 80 that are not sharp-notes. Similarly, flat-notes (not shown in FIG. 8) may be differently colored visually or may be otherwise distinguishable from notes that are not flat-notes.

FIG. 8 also depicts one example of an embodiment in which the timing bars 300 extend both above and below the lines of the staff and can therefore include one or more notes (such as the high G#) that are placed above the staff and one or more notes (such as the low C#) that are placed below the staff. In other embodiments, the timing bars 300 may extend only above or only below the staff as needed to include the notes of the music. In still other embodiments, timing bars 300 may be extended individually, as needed. Although, FIG. 8 includes the simplified musical notation system described above, timing bars that extend above and/or below the musical staff may additionally or alternatively be used in conjunction with the more commonly used system for writing notes that is depicted in FIGS. 2-5 of this disclosure. Furthermore, extended timing bars 300 may be used in conjunction with other systems of musical notation.

As has been disclosed above, the method and display disclosed herein may be used advantageously in conjunction with other form of musical notation, such as, for example, Braille music. Braille music is a Braille code that allows music to be notated so that it can be "read" by visually impaired musicians. Braille music uses the same six-position, domino-shaped "cell" of raised bumps as does literary Braille. However, Braille music notation assigns an entirely separate meaning to each Braille symbol or group of symbols and has its own syntax and abbreviations.

The timing bars 300 disclosed herein may be adapted in any of a number of ways for use with Braille music. For example, in one embodiment, the raised bumps of the Braille symbols may be positioned on portions of the Braille music having different background textures that indicate the different timing bars 300. Such differently textured timing bars 300 are configured to be tactilely discernible to a reader of the Braille music.

In another embodiment, as depicted in FIGS. 9A and 9B, the timing bars are represented by providing a background for the Braille music cells, such as on a page of imprinted Braille music which has portions that are at discernibly different elevations from one another to represent the different timing bars. FIGS. 9A and 9B depict two side views, not drawn to scale, of pages 900 on which Braille music with timing bars has been imprinted. The Braille symbols are configured from embossed bumps 91 that extend upward from the surface of the page 900 on which the music notation is presented. As depicted in FIGS. 9A and 9B, some portions of the page 900 are pressed, embossed, or otherwise manipulated to create substantially horizontal timing bars 300' that are more elevated with reference to a flat, underside 92 of the page 900 and timing bars 300" that are less elevated with reference to the flat, underside 92 of the page 900. The bumps 91 of the Braille music symbols may be positioned on the appropriate timing bars 300', 300" in accordance with rhythmic aspects of the music and may be discernible to a music reader reading the Braille music by touch. In the embodiment depicted in FIG. 9A, all of the timing bars 300', 300" have an equal width, while in the embodiment depicted in FIG. 9B, the timing bars 300', 300" are of various unequal widths.

The display and method are described herein with respect to one standard type of music notation that is used for notating various types of music in the United States, Europe, and throughout many other parts of the world. The systems and methods described herein may also be used in conjunction with other types of music notation. For example, the timing bars may be used with standard percussion scores even though they may not include notes with pitch and/or duration and instead include symbols indicating when various percussion instruments should be struck or otherwise played. Similarly, timing bars 300 may be advantageously used with other musical notation systems that use other systems of notation for the notes 110, rests 120, staff 100, and/or other musical symbols.

While certain embodiments of the invention have been described, these embodiments have been presented by way of example only, and are not intended to limit the scope of the invention. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A method of representing rhythm in a music composition for display upon an electronic display device, the method comprising:
   displaying upon an electronic display device a musical staff comprising five horizontal lines;
   displaying upon the electronic display device a plurality of musical notes, each musical note being associated with a number of beats, or a portion of a beat, wherein the musical notes are positioned on the musical staff and are divided amongst a plurality of measures, each measure being defined, at least in part, by one or two measure bars placed across the musical staff in a direction perpendicular to the five horizontal lines, each measure further representing an equal number of beats of the musical composition; and
   displaying upon the electronic display device a plurality of timing bars positioned on the musical staff, each timing bar representing an equal number of beats within a measure, wherein each timing bar is visually distinguishable from a timing bar adjacent to it along the musical staff, and wherein the one or more musical notes of the measure are visually displayed within the timing bars, based, at least in part, on the number of beats or portions thereof associated with each of the one or more musical notes.

2. The method of representing rhythm in a music composition of claim 1, wherein each of the timing bars has a width that extends along the musical staff and the width of each timing bar is the same.

3. The method of representing rhythm in a music composition of claim 1, wherein each of the timing bars has a width that extends along the musical staff, and wherein the widths of at least two timing bars are not equal.

4. The method of representing rhythm in a music composition of claim 3, wherein at least one timing bar has a width that is based, at least in part, on the number of musical notes displayed within the timing bar.

5. The method of representing rhythm in a music composition of claim 3, further comprising providing, in association with the timing bars, lyrics of the music composition, wherein at least one timing bar has a width that is based, at least in part, on the length of the lyrics that correspond to the one or more notes in the timing bar.

6. The method of representing rhythm in a music composition of claim 1, further comprising displaying the musical notes, the musical staff, and the timing bars on sheet music.

7. The method of claim 1, further comprising:
   calculating a correct placement of the plurality of timing bars on the musical staff such that musical notes displayed within at least one of the plurality of timing bars correspond to the equal number of beats represented by the timing bar.

8. The method of claim 1, further comprising:
   additionally displaying the musical staff, the plurality of musical notes, and the plurality of timing bars in a non-electronic format.

9. A computer-implemented device for representing rhythm in musical notation, the computer-implemented device comprising:
   an electronic display device for displaying at least one musical staff comprising five horizontal lines upon which can be displayed a plurality of symbols for musical notes included in a musical composition and measures into which the musical composition can be divided, each measure being defined, at least in part, by one or two measure bars placed across the musical staff in a direction perpendicular to the five horizontal lines, each measure further representing an equal number of beats of the musical composition; and a timing bar placement system for placing a plurality of timing bars sequentially along the musical staff and extending across the staff, wherein adjacent timing bars have different backgrounds, the timing bars corresponding to equal timed portions of the music and defining spaces suitable for displaying one or more musical symbols representing notes to be played within said timed portions of the music, wherein each measure includes at least two timing bars.

10. The display of claim 9, wherein the electronic display is configured to allow the user to input data that causes musical notation to be displayed within the spaces defined by the musical staff and the timing bars.

* * * * *